No. 748,466. PATENTED DEC. 29, 1903.
F. BATEMAN.
MOUNTING FOR CULTIVATOR TEETH.
APPLICATION FILED JUNE 2, 1903.
NO MODEL.
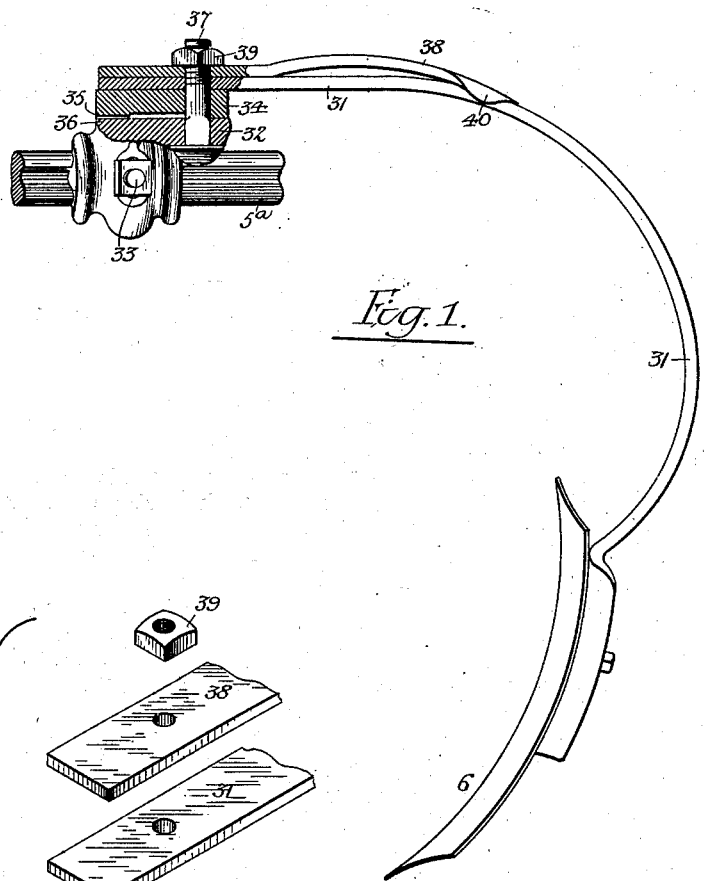
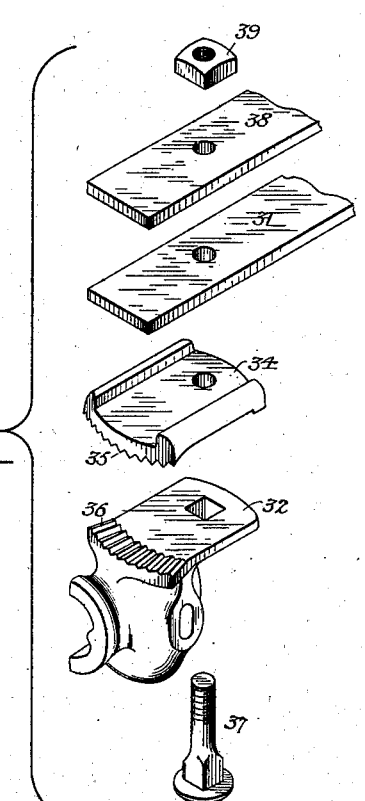

No. 748,466. Patented December 29, 1903.

UNITED STATES PATENT OFFICE.

FRANK BATEMAN, OF GRENLOCH, NEW JERSEY, ASSIGNOR TO BATEMAN MANUFACTURING COMPANY, OF GRENLOCH, NEW JERSEY, A CORPORATION OF NEW JERSEY.

MOUNTING FOR CULTIVATOR-TEETH.

SPECIFICATION forming part of Letters Patent No. 748,466, dated December 29, 1903.

Original application filed February 25, 1903, Serial No. 144,929. Divided and this application filed June 2, 1903. Serial No. 159,787. (No model.)

*To all whom it may concern:*

Be it known that I, FRANK BATEMAN, a citizen of the United States, and a resident of Grenloch, Camden county, New Jersey, have invented certain Improvements in Mountings for Cultivator-Teeth, of which the following is a specification, the same being a division of my application, Serial No. 144,929, filed February 25, 1903.

One object of my invention is to provide simple and effective means for mounting the stems or shanks of cultivator-teeth upon the bars which carry the same, a further object being to retard the upward swing of the elastic stem of the cultivator-tooth without interfering with its fore-and-aft elasticity. These objects I attain in the manner hereinafter set forth, reference being had to the accompanying drawings, in which—

Figure 1 is a view, partly in side elevation and partly in section, illustrating my improved devices for mounting the stem or shank of the cultivator-tooth upon its supporting-bar; and Fig. 2 is a perspective view of the various parts of said mounting detached from each other.

Each of the cultivator-teeth 6 is secured to the curved rear end of a stem or shank 31, having a horizontal upper portion, which is mounted at its forward end upon a hanger-block 32, the latter being secured, by means of a clamp-bolt 33, to the rounded and recessed supporting-bar 5$^a$. The forward end of the stem 31 of the cultivator-tooth is let into the recessed upper face of a carrier-block 34, which rests upon the upper face of the hanger-block 32 and has a notched segmental portion 35 for engagement with a similarly-notched segmental portion 36 on said block 32, these notched segmental portions being concentric with a bolt 37, whereby the blocks 32 and 34 and the stem 31 are secured together. Hence said stem 31 is susceptible of a certain amount of lateral swinging adjustment in reference to the supporting-bar 5$^a$, the notched segments 35 and 36 securing it in any such position of adjustment.

The curved stem 31 is resilient, so that the cultivator-tooth 6 will be permitted to yield rearwardly when it meets with undue resistance, and in addition to thus yielding rearwardly the stem 31 can also yield upwardly, owing to the resiliency of its horizontal upper portion. As, however, it is not desirable to permit the cultivator-tooth to rise too freely from the ground, a supplementary spring-plate 38 bears upon the top of the stem 31 and has ears 40 flanking said stem, so as to prevent lateral displacement of the spring therefrom, this spring-plate also receiving the bolt 37 and serving as a bearing for the nut 39, with which said bolt is provided, as shown in Fig. 1. The single bolt 37 thus serves to secure the carrier-block, the stem, and the spring to the hanger-block 32. The supplementary spring-plate 38 is curved or bowed, so that it only bears upon the stem 31 at the point where the latter is secured to the carrier-block 34 and at the point where the stem begins to curve downwardly. By this means the desired yielding downward thrust is imparted to the stem without rendering its horizontal upper portion as rigid as it would be if the spring-plate 38 conformed to and had throughout its entire extent a bearing upon the upper portion of the stem.

By employing the supplementary spring-plate 38 I am enabled to use for the stem 31 metal of uniform thickness throughout and so thin that the curved rear portion of the same will have the desired degree of resiliency, while at the same time its horizontal upper portion will resist vertical movement to a greater extent than if it did not have the supplementary spring backing.

Having thus described my invention, I claim and desire to secure by Letters Patent—

1. The combination, in a tooth-hanger for cultivators, of a supporting-bar, a hanger-block secured thereto and having a notched segment, a cultivator-tooth having a curved stem with forwardly-projecting top portion, a carrier-block whose upper surface is engaged by said top portion of the stem, said carrier-block having on the under side a notched segment engaging that of the hanger-block, and a single bolt and nut whereby the two blocks and the tooth-stem are secured together, substantially as specified.

2. The combination of a cultivator-tooth having a curved stem, a mounting therefor, and a spring-plate bearing upon the top of said stem, and serving to resist upward movement of the same, substantially as specified.

3. The combination of a cultivator-tooth having a curved stem with substantially horizontal top portion, a mounting for said stem, and a curved or bowed spring-plate bearing upon the stem at the outer end of the top portion of the same, substantially as specified.

4. The combination of a cultivator-tooth having a curved stem, a mounting for the latter, and a curved spring bearing upon the top of said stem and having ears to prevent its lateral displacement, substantially as specified.

5. The combination of a cultivator-tooth, a supporting-bar therefor, a hanger-block thereon, a resilient tooth-stem having a curved rear portion and a forwardly-projecting horizontal top portion, means for securing said top portion of the stem to the hanger-block on the supporting-bar, and a supplementary spring-plate bearing upon the top portion of the stem and serving to resist upward movement of the same, substantially as specified.

6. The combination of a cultivator-tooth, a supporting-bar therefor, a hanger-block secured to said bar, and having a notched segment, a resilient tooth-stem having a curved rear portion, and a forwardly-projecting top portion, a carrier-block engaged by said top portion of the stem and having a notched segment engaging that of the hanger-block, a spring bearing upon the top portion of the tooth-stem, and a single bolt and nut whereby the hanger, the carrier-block, the tooth-stem, and the spring are secured together, substantially as specified.

In testimony whereof I have signed my name to this specification in the presence of two subscribing witnesses.

FRANK BATEMAN.

Witnesses:
   J. M. EBERT,
   W. O. STUTS.